United States Patent [19]

Mesnel

[11] 4,416,951

[45] Nov. 22, 1983

[54] EXTRUDED SEALING STRIP WITH FABRIC COVERED GRIPPING MEANS, PARTICULARLY FOR APPLICATION TO AUTOMOTIVE VEHICLES

[75] Inventor: Francois Mesnel, Neuilly-sur-Seine, France

[73] Assignee: Etablissements Mesnel, Carrieres-sur-Seine, France

[21] Appl. No.: 358,612

[22] Filed: Mar. 16, 1982

[30] Foreign Application Priority Data

Mar. 30, 1981 [FR] France .............................. 81 06268
Jul. 7, 1981 [FR] France .............................. 81 13329

[51] Int. Cl.³ ............................................ B22F 37/00
[52] U.S. Cl. .................................... 428/586; 156/221; 24/306
[58] Field of Search ......................... 428/586; 156/221; 24/306

[56] References Cited

U.S. PATENT DOCUMENTS 2,153,484 4/1939 Schemmel ........................... 156/221

FOREIGN PATENT DOCUMENTS 524171 11/1953 Belgium .
1161142 9/1956 France .
1496662 3/1974 United Kingdom .

Primary Examiner—Veronica O'Keefe
Attorney, Agent, or Firm—Schwartz, Jeffery, Schwaab, Mack, Blumenthal & Koch

[57] ABSTRACT

The invention concerns extruded sealing strips of a resilient material with a center core or reinforcement in the form of gripping means. Such sealing strips are typically used around automobile doors or door frames. The body of the sealing strip has at least a partial fabric covering which is of a light and economical structure. This material is coated with a vinyl plastisol which advantageously is microporous. The coated material is then embossed and finally adhesively bonded, with an adhesive based on saturated polyurethane, which is not reactive in solution. Flocking may be applied prior to or after the bonding to further improve the esthetic appearance of the assembly.

17 Claims, 9 Drawing Figures

EXTRUDED SEALING STRIP WITH FABRIC COVERED GRIPPING MEANS, PARTICULARLY FOR APPLICATION TO AUTOMOTIVE VEHICLES

BACKGROUND OF THE INVENTION

1. Technical Field of the Disclosure

The present invention concerns extruded sealing strips of resilient material having a gripping portion with a center core of reinforcement for effecting gripping to a base or flange, such as around an automobile door, the body of the sealing strip being at least partially covered with a textile material.

2. Description of the Prior Art

Flanged or extruded sealing strips, with reinforced gripping means, generally of natural, artificial or synthetic elastomers or of so-called "plastic" materials, which are elastic or at least capable of deformation, are known. They are intended particularly for application to the doors of automotive vehicles. Typically there is combined with such deformable shapes, at least in part, a fabric covering, usually of a good quality material which is relatively expensive and which has a rather pleasing finish. This finish may be obtained for example by flocking. Yet, because of the relatively "tight" structure of such fabrics, the elastic properties of the seals equipped with them are hindered and reduced. Also, these fabrics tend to crease on the surface in areas of curvatures with relatively short radii, which is detrimental both to their appearance and their sealing tightness.

SUMMARY OF THE INVENTION

The invention is intended to eliminate these disadvantages by means of a novel combination. Rather than using a covering of a high quality fabric, the present invention employs an inexpensive fabric of a very light grade, having very loose structures and consisting of inexpensive, natural, artificial or synthetic textiles, woven or not, or even of the so-called "mesh" type, combined with a coating of a slightly porous vinyl plastisol having a weight on the order of 300 to 500 g/m$^2$ applied and dimensioned for example by means of a "squeegee". This coating is "embossed" for example by means of a so-called "texturing" cylinder, which imparts great inherent elasticity in all directions to strips of a fabric treated in this manner, the elasticity increasing with the depth of the embossing.

In order to insure a satisfactory interaction of the strips of fabric prepared in this manner with the extruded seal, which is reinforced by the abovementioned gripping means, the fabric is combined with the extruded seal by a mutual adhesive bonding, advantageously limited to the base or the peaks of the "embossing". This is effected, for example, by means of a "compatible" adhesive, advantageously of a saturated polyurethane base, which is nonreactive in solution, which makes it possible to effect certain economies, and above all which effects a large number of separate small bonds by a simple raise in temperature, after rapid drying. Simultaneously, the process effects the bonding of potential corners of the fabric, particularly in the case of the use of shapes made of so-called PVC plastic material.

Thus, with new industrial products constituted and characterized in the abovedescribed manner, both the appearance and the tightness of the abovementioned seals are improved in all cases, regardless of the radii of the curvatures imposed. At the same time, the form of the embossing contributes to the esthetics of its appearance and may be varied in keeping with the wishes of the customers. The appearance may be further improved for example by "flocking" performed in a conventional manner by the so-called "electrostatic" process, advantageously with very short cut lengths of filaments, on the order of 0.5 to 1 mm of projection, applied prior to or after the adhesive bonding of the fabric improved according to the invention.

To reiterate and expand upon the foregoing in somewhat different terms, the sealing strip of the present invention comprises a deformable body of extruded material, the body having a reinforcement for effecting gripping of the sealing strip to a base, such as the door or door frame of an automobile. At least part of the body of the sealing strip has a covering thereon. The covering includes a light grade textile material having a loose structure and a coating of vinyl plastisol on the textile material. The coated textile material is embossed to provide a plurality of raised areas and a plurality of depressed areas between the raised areas. The raised areas are formed by a plurality of cells between the body and the textile material. There is an adhesive between at least the depressed areas of the embossed textile and the body of the sealing strip, the adhesive bonding only the depressed areas of the textile material to the body, the textile material being unattached to the body in the regions of the raised areas. Thus, the covering of textile material is readily elastically deformable, and this covering does not interfere with the deformability of the body of the sealing strip.

In terms of the method of the invention, the method of course is for providing a resilient extruded sealing strip with a covering. The method includes the steps of coating a light grade, relatively inexpensive textile material having a loose structure with vinyl plastisol; covering at least part of the body of the sealing strip with the coated textile material; embossing the coated textile material to provide a plurality of raised areas and a plurality of depressed areas between the raised areas, the rasied areas forming a plurality of cells between the textile material and the body; and adhesively bonding the embossed textile material to the body of the sealing strip only in the depressed areas of the embossed textile material. As alluded to above, the coating step may be carried out with a squeegee and the embossing step may be carried out with a texturing cylinder.

When taken in cross section perpendicular to the general plane of the textile material, the raised areas may have the shape of either a truncated hexagon or truncated diamond. In one embodiment, the raised areas will have the form of zig-zag lines when seen in elevational view.

BRIEF DESCRIPTION OF THE DRAWINGS

The novel characteristics of the invention and other characteristics which accompany them will become more apparent from the description hereinafter and the drawings attached hereto, showing and illustrating, by means of simple examples, some advantageous, but not limiting, modes of embodiment wherein.

DETAILED DESCRIPTION

Figure 1:
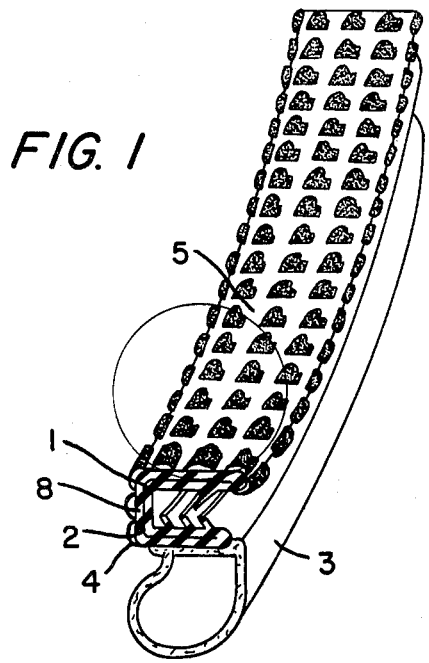
FIG. 1 shows in a perspective view a section of an automotive body seal according to the invention of the type combining a tubular sealing profile with another extruded "gripping" profile surrounding a metal center reinforcement in the shape of a U and improved by means of a novel fabric covering.
Figure 2:
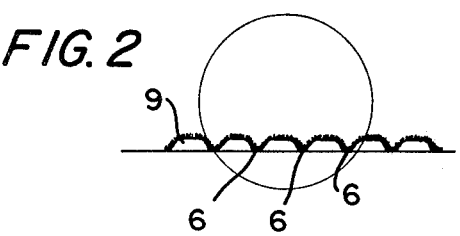
FIG. 2 shows in a transverse section, taken on the line A—A of FIG. 3 and in the direction of the arrows, the aforecited novel fabric.
Figure 3:
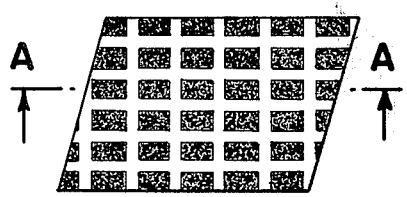
FIG. 3 shows in a front elevation a section of the "embossed" fabric covering of FIGS. 1 and 2.

According to the embodiments shown in FIGS. 1-3, there is illustrated a section of a resilient automotive body sealing strip of the type mentioned hereinabove, combining in the usual manner an extruded or flanged gripping profile 1 made of a natural, artificial or synthetic elastomer, or of a so-called "plastic" material, such as PVC, that is elastic or at least deformable surrounding a metal center reinforcement 2 bent in the shape of a U or a grip (in transverse cross section) and interacting with another extruded tubular sealing shape 3, advantageously cellular, or at least highly flexible.

Figure 8:
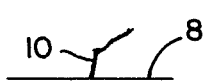
FIG. 8 schematically shows a squeegee for applying a coating to the fabric covering.
Figure 9:
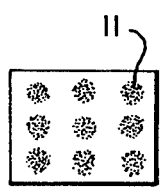
FIG. 9 shows in front elevation a section of the fabric covering with a manufacturer's emblem embossed thereon.

According to the invention, the basic sealing strip is significantly improved by covering the gripping profile 1 with a strip of a fabric 8 on sides 4 and 5 thereof. This fabric 8 at the time it is applied is of a very mediocre and light quality. However, the fabric carries a vinyl plastisol coating that is slightly "microporous" in order to effect a preliminary "embossing" of the covering, so as to limit the interaction of this covering fabric with the gripping profile 1. That is, the fabric of the covering interacts with the gripping portion profile 1 in a highly discontinuous fashion so that there are a large number of small, separate bonds, such as 6, separated from each other by small cells filled with air, in the form of a truncated diamond or hexagon. In this regard, it will be apparent from FIG. 2 that each of the cells has the shape of a hexagon which has been symmetrically truncated in half along a line extending between two opposed corners of the hexagon. It will be apparent that the diamond shape shown in FIG. 5 has the shape of an elongated diamond symmetrically truncated in half by a line extending between the two opposed corners of the elongated diamond which are closest to each other. The cells, of course, are formed by protuberances or raised areas 9 in the embossed fabric. The embossing is preferably effected by a texturing cylinder 10 (FIG. 8) and the coating of vinyl plastisol is preferably applied by a squeegee 11 (FIG. 9).

It is readily seen that, by virtue of the character of these interacting bonds between the embossed cover fabric and the gripping profile 1, which bonds are very discontinuous but at the same time very close to one another, the gripping profile 1 is capable of perfectly adapting to the radii of curvature it is to follow, without the danger of being "retained" by the fabric covering. In view of its embossing, the fabric covering can adapt to any situation by means of simple elastic deformations of the raised areas 9 (i.e., the fabric portions forming the cells which give the embossed appearance) while at the same time the freedom of the fabric covering to shift with respect to the gripping profile 1 is rather limited by its multiple respective "points of anchorage" at the depressed areas 6 of the embossed pattern.

Figure 4:
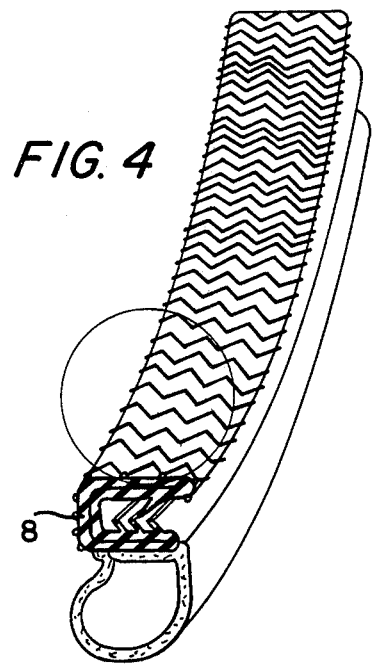
FIG. 4 shows a perspective view of a variant embodiment of a section of an automotive body seal of the overall type shown in FIG. 1.
Figure 5:
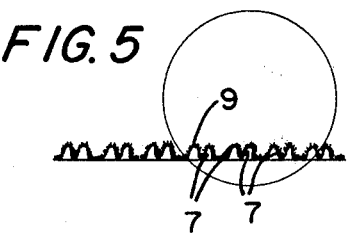
FIG. 5 shows in transverse cross section, taken on line B—B of FIG. 6, the variant embodiment of the fabric cover according to the invention.
Figure 6:
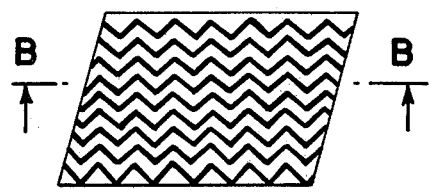
FIG. 6 shows in front elevation a section of the fabric covering of FIGS. 4 and 5.
Figure 7:
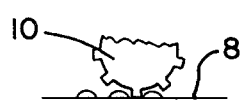
FIG. 7 schematically shows a texturing cylinder for embossing the fabric covering.

It is readily seen that in the alternative embodiment of FIGS. 4, 5 and 6 there is a transposition of the respective anchoring points. Reference character 7 in FIG. 5 refers to air-filled cells in a zig-zag shape, and these are even more capable of following all of the radii of curvature of the gripping profile 1, without the risk of being limited or restrained by the fabric cover. It must be repeated that this fabric cover conforms automatically to any situation by the simple elastic deformation of the raised areas 9, i.e., by the deformation of the fabric forming the cells which provide the embossing, the movement of the fabric being limited in a predetermined manner by the pattern of said embossing.

As is well known, the sealing strips of the type to which the present invention generally relates are typically used around door frames or doors of automobiles. The textile material 8 of the covering may be of a natural, artificial or synthetic textile of a light grade and may be either woven or non-woven. It will preferably be an economical, i.e., relatively inexpensive, material. It may even be a mesh-type material. The vinyl plastisol coating applied to the textile material is advantageously microporous and has a weight on the order of 300 to 500 g/m². The adhesive used for bonding the depressed areas of the embossed pattern to the body of the sealing strip is preferably an adhesive based on saturated polyurethane which is thus non-reactive in solution. This assures that the adherence between the textile material and the body of the sealing strip is limited to the depressed areas between the protuberances or raised areas 9 of the embossed textile material. This reduces the consumption of adhesive, and of course contributes to the ability of the resilient body of the sealing strip to bend without interference from the textile material 8 which has been applied thereto.

In this respect, it is evident that these embossing patterns are infinitely variable and that the invention is not restricted to the modes of embodiment explicitly described hereinabove. To the contrary, its scope extends explicitly to cover all variants of embodiment and application, including seals other than those for automotive bodies. Specifically, the scope of the invention extends to all those variations using means, processes or combinations equivalent or simply comparable to those described herein, and particularly to variations entailing inversion or transposition of the dispositions described or simply suggested hereinabove.

It is further to be understood concerning the pattern of the abovecited embossing that this pattern may consist advantageously of original designs, forming for example the emblem 11 of the manufacturer employing the seals. It is also to be understood in connection with certain aforecited expressions that, where reference is made to very mediocre and light fabrics, this is intended to mean fabrics of a very light grade with very loose structures.

What is claimed is:

1. A sealing strip comprising a deformable body of extruded material; said body having a reinforcement for effecting gripping of said sealing strip to a base, at least part of said body having a covering thereon, said covering including:
- a light grade textile material having a loose structure;
- a coating of vinyl plastisol on said textile material, said coated textile material being embossed to provide a plurality of raised areas and a plurality of depressed areas between said raised areas, said raised areas being formed by a plurality of cells between said body and said textile material; and
- an adhesive between at least said depressed areas and said body, said adhesive bonding only said depressed areas of said textile material to said body, said textile material being unattached to said body in the regions of said raised areas;
- whereby said covering of textile material is readily elastically deformable and does not interfere with the deformability of said body of the sealing strip.

2. A sealing strip as defined in claim 1, wherein said raised areas have the shape, when taken in a cross section perpendicular to the general plane of the textile material, of a truncated hexagon.

3. A sealing strip as defined in claim 1, wherein said raised areas have the shape, when taken in a cross section perpendicular to the general plane of the textile material, of truncated points of a diamond shape.

4. A sealing strip as defined in claim 1, wherein said raised areas have the form of zig-zag lines when seen in an elevational view.

5. A sealing strip as defined in claim 1, wherein said base to which the sealing strip is attached to part of a vehicle and wherein said raised portions have the shape of an emblem of the manufacturer of the vehicle.

6. A sealing strip as defined in claim 1, wherein said base has a gripping portion with a U-shaped configuration in transverse cross section and a sealing portion which is of a tubular configuration, said reinforcement for said body being of metal and being located in said gripping portion.

7. A sealing strip as defined in claim 6, wherein said body is constructed of a plastic material.

8. A sealing strip as defined in claim 7, wherein said plastic material is PVC.

9. A sealing strip as defined in claim 6, wherein said body is constructed of an elastomeric material.

10. A sealing strip as defined in claim 1, wherein said textile material of said covering is a woven fabric.

11. A sealing strip as defined in claim 1, wherein said textile material of said covering is a non-woven material.

12. A sealing strip as defined in claim 1, wherein said textile material of said covering is a relatively inexpensive material.

13. A sealing strip as defined in claim 1, wherein said coating on said textile material is a coating applied by a squeegee.

14. A sealing strip as defined in claim 1, wherein said vinyl plastisol coating is microporous and is of a weight on the order of 300 to 500 g/m$^2$.

15. A sealing strip as defined in claim 1, wherein the embossed raised and depressed areas are provided by a texturing cylinder.

16. A sealing strip as defined in claim 1, wherein said adhesive has a saturated polyurethane base.

17. A sealing strip as defined in claim 1, wherein, in addition to the embossed raised and depressed areas, said textile material includes flocking thereon.

* * * * *